United States Patent
Holz (10) Patent No.: US 9,747,696 B2
(45) Date of Patent: Aug. 29, 2017

(54) SYSTEMS AND METHODS FOR PROVIDING NORMALIZED PARAMETERS OF MOTIONS OF OBJECTS IN THREE-DIMENSIONAL SPACE

(71) Applicant: Leap Motion, Inc., San Francisco, CA (US)

(72) Inventor: David Holz, San Francisco, CA (US)

(73) Assignee: Leap Motion, Inc., San Francisco, CA (US)

(*) Notice: Subject to any disclaimer, the term of this patent is extended or adjusted under 35 U.S.C. 154(b) by 246 days.

(21) Appl. No.: 14/281,804

(22) Filed: May 19, 2014

(65) Prior Publication Data

US 2014/0340524 A1 Nov. 20, 2014

Related U.S. Application Data

(60) Provisional application No. 61/824,666, filed on May 17, 2013.

(51) Int. Cl.
*G06T 7/20* (2017.01)
*G06K 9/32* (2006.01)
(Continued)

(52) U.S. Cl.
CPC ........ *G06T 7/2086* (2013.01); *G06K 9/00335* (2013.01); *G06K 9/3233* (2013.01);
(Continued)

(58) Field of Classification Search
CPC ....... G06T 7/2086; G06T 7/20; H04N 5/2256; H04N 5/225; G06K 9/32; G06K 2009/3291
(Continued)

(56) References Cited

U.S. PATENT DOCUMENTS 2,665,041 A 1/1954 Maffucci
4,175,862 A 11/1979 DiMatteo et al.
(Continued)

FOREIGN PATENT DOCUMENTS

CN 105308536 A 2/2016
DE 11 2014 000 441 T5 10/2015
(Continued)

OTHER PUBLICATIONS

U.S. Appl. No. 14/281,817—Office Action dated Sep. 28, 2015, 5 pages.
(Continued)

*Primary Examiner* — Tung Vo
*Assistant Examiner* — Zaihan Jiang
(74) *Attorney, Agent, or Firm* — Haynes Beffel & Wolfeld LLP; Ernest J. Beffel, Jr.

(57) ABSTRACT

Systems and methods are disclosed for detecting user gestures using detection zones to save computational time and cost and/or to provide normalized position-based parameters, such as position coordinates or movement vectors. The detection zones may be established explicitly by a user or a computer application, or may instead be determined from the user's pattern of gestural activity. The detection zones may have three-dimensional (3D) boundaries or may be two-dimensional (2D) frames. The size and location of the detection zone may be adjusted based on the distance and direction between the user and the motion-capture system.

22 Claims, 4 Drawing Sheets

(51) Int. Cl.
*H04N 5/225* (2006.01)
*G06K 9/00* (2006.01)
*G06T 7/246* (2017.01)

(52) U.S. Cl.
CPC ...... *G06T 7/251* (2017.01); *G06K 2009/3291* (2013.01); *G06T 2207/10016* (2013.01); *G06T 2207/10021* (2013.01); *G06T 2207/30196* (2013.01)

(58) Field of Classification Search
USPC .......................................... 348/169; 382/103
See application file for complete search history.

(56) References Cited

U.S. PATENT DOCUMENTS

| | | |
|---|---|---|
| 4,879,659 A | 11/1989 | Bowlin et al. |
| 5,134,661 A | 7/1992 | Reinsch |
| 5,282,067 A | 1/1994 | Liu |
| 5,454,043 A | 9/1995 | Freeman |
| 5,574,511 A | 11/1996 | Yang et al. |
| 5,581,276 A | 12/1996 | Cipolla et al. |
| 5,594,469 A | 1/1997 | Freeman et al. |
| 5,742,263 A | 4/1998 | Wang et al. |
| 5,900,863 A | 5/1999 | Numazaki |
| 5,901,170 A | 5/1999 | Peysakhovich et al. |
| 6,002,808 A | 12/1999 | Freeman |
| 6,031,161 A | 2/2000 | Baltenberger |
| 6,031,661 A | 2/2000 | Tanaami |
| 6,072,494 A | 6/2000 | Nguyen |
| 6,075,892 A | 6/2000 | Fan et al. |
| 6,075,895 A | 6/2000 | Qiao et al. |
| 6,147,678 A | 11/2000 | Kumar et al. |
| 6,154,558 A | 11/2000 | Hsieh |
| 6,181,343 B1 | 1/2001 | Lyons |
| 6,184,326 B1 | 2/2001 | Razavi et al. |
| 6,184,926 B1 | 2/2001 | Khosravi et al. |
| 6,195,104 B1 | 2/2001 | Lyons |
| 6,204,852 B1 | 3/2001 | Kumar et al. |
| 6,252,598 B1 | 6/2001 | Segen |
| 6,263,091 B1 | 7/2001 | Jain et al. |
| 6,493,041 B1 | 12/2002 | Hanko et al. |
| 6,498,628 B2 | 12/2002 | Iwamura |
| 6,603,867 B1 | 8/2003 | Sugino et al. |
| 6,629,065 B1 | 9/2003 | Gadh et al. |
| 6,661,918 B1 | 12/2003 | Gordon et al. |
| 6,702,494 B2 | 3/2004 | Dumler et al. |
| 6,798,628 B1 | 9/2004 | Macbeth |
| 6,804,654 B2 | 10/2004 | Kobylevsky et al. |
| 6,804,656 B1 | 10/2004 | Rosenfeld et al. |
| 6,814,656 B2 | 11/2004 | Rodriguez |
| 6,819,796 B2 | 11/2004 | Hong et al. |
| 6,901,170 B1 | 5/2005 | Terada et al. |
| 6,919,880 B2 | 7/2005 | Morrison et al. |
| 6,950,534 B2 | 9/2005 | Cohen et al. |
| 6,993,157 B1 | 1/2006 | Oue et al. |
| 7,213,707 B2 | 5/2007 | Hubbs et al. |
| 7,215,828 B2 | 5/2007 | Luo |
| 7,244,233 B2 | 7/2007 | Krantz et al. |
| 7,257,237 B1 | 8/2007 | Luck et al. |
| 7,259,873 B2 | 8/2007 | Sikora et al. |
| 7,308,112 B2 | 12/2007 | Fujimura et al. |
| 7,340,077 B2 | 3/2008 | Gokturk et al. |
| 7,519,223 B2 | 4/2009 | Dehlin et al. |
| 7,532,206 B2 | 5/2009 | Morrison et al. |
| 7,536,032 B2 | 5/2009 | Bell |
| 7,542,586 B2 | 6/2009 | Johnson |
| 7,598,942 B2 | 10/2009 | Underkoffler et al. |
| 7,606,417 B2 | 10/2009 | Steinberg et al. |
| 7,646,372 B2 | 1/2010 | Marks et al. |
| 7,656,372 B2 | 2/2010 | Sato et al. |
| 7,665,041 B2 | 2/2010 | Wilson et al. |
| 7,692,625 B2 | 4/2010 | Morrison et al. |
| 7,831,932 B2 | 11/2010 | Josephsoon et al. |
| 7,840,031 B2 | 11/2010 | Albertson et al. |
| 7,861,188 B2 | 12/2010 | Josephsoon et al. |
| 7,886,229 B2 | 2/2011 | Pachet |
| 7,886,236 B2 | 2/2011 | Kolmykov-Zotov et al. |
| 7,940,885 B2 | 5/2011 | Stanton et al. |
| 7,948,493 B2 | 5/2011 | Klefenz et al. |
| 7,971,156 B2 | 6/2011 | Albertson et al. |
| 7,980,885 B2 | 7/2011 | Gattwinkel et al. |
| 8,064,704 B2 | 11/2011 | Kim et al. |
| 8,085,339 B2 | 12/2011 | Marks |
| 8,086,971 B2 | 12/2011 | Radivojevic et al. |
| 8,111,239 B2 | 2/2012 | Pryor et al. |
| 8,112,719 B2 | 2/2012 | Hsu et al. |
| 8,144,233 B2 | 3/2012 | Fukuyama |
| 8,185,176 B2 | 5/2012 | Mangat et al. |
| 8,213,707 B2 | 7/2012 | Li et al. |
| 8,230,852 B2 | 7/2012 | Zhang et al. |
| 8,235,529 B1 | 8/2012 | Raffle et al. |
| 8,244,233 B2 | 8/2012 | Chang et al. |
| 8,289,162 B2 | 10/2012 | Mooring et al. |
| 8,290,208 B2 | 10/2012 | Kurtz et al. |
| 8,514,221 B2 | 8/2013 | King et al. |
| 8,631,355 B2 | 1/2014 | Murillo et al. |
| 8,638,989 B2 | 1/2014 | Holz |
| 8,659,594 B2 | 2/2014 | Kim et al. |
| 8,659,658 B2 | 2/2014 | Vassigh et al. |
| 8,693,731 B2 | 4/2014 | Holz et al. |
| 8,817,087 B2 | 8/2014 | Weng et al. |
| 8,842,084 B2 | 9/2014 | Andersson et al. |
| 8,843,857 B2 | 9/2014 | Berkes et al. |
| 8,854,433 B1 * | 10/2014 | Rafii ...................... G06F 3/017 348/42 |
| 8,872,914 B2 | 10/2014 | Gobush |
| 8,930,852 B2 | 1/2015 | Chen et al. |
| 9,056,396 B1 | 6/2015 | Linnell |
| 9,389,779 B2 | 7/2016 | Anderson et al. |
| 9,436,288 B2 | 9/2016 | Holz |
| 2002/0008211 A1 | 1/2002 | Kask |
| 2002/0021287 A1 | 2/2002 | Tomasi et al. |
| 2002/0105484 A1 | 8/2002 | Navab et al. |
| 2003/0053658 A1 | 3/2003 | Pavlidis |
| 2003/0053659 A1 | 3/2003 | Pavlidis et al. |
| 2003/0081141 A1 | 5/2003 | Mazzapica |
| 2003/0123703 A1 | 7/2003 | Pavlidis et al. |
| 2003/0152289 A1 | 8/2003 | Luo |
| 2003/0202697 A1 | 10/2003 | Simard et al. |
| 2004/0046736 A1 | 3/2004 | Pryor et al. |
| 2004/0125228 A1 | 7/2004 | Dougherty |
| 2004/0145809 A1 | 7/2004 | Brenner |
| 2004/0212725 A1 | 10/2004 | Raskar |
| 2005/0068518 A1 | 3/2005 | Baney et al. |
| 2005/0131607 A1 | 6/2005 | Breed |
| 2005/0168578 A1 | 8/2005 | Gobush |
| 2005/0236558 A1 | 10/2005 | Nabeshima et al. |
| 2006/0017807 A1 | 1/2006 | Lee et al. |
| 2006/0072105 A1 | 4/2006 | Wagner |
| 2006/0210112 A1 | 9/2006 | Cohen et al. |
| 2006/0290950 A1 | 12/2006 | Platt et al. |
| 2007/0042346 A1 | 2/2007 | Weller |
| 2007/0130547 A1 | 6/2007 | Boillot |
| 2007/0206719 A1 | 9/2007 | Suryanarayanan et al. |
| 2007/0238956 A1 | 10/2007 | Haras et al. |
| 2008/0013826 A1 | 1/2008 | Hillis et al. |
| 2008/0056752 A1 | 3/2008 | Denton et al. |
| 2008/0064954 A1 | 3/2008 | Adams et al. |
| 2008/0106746 A1 | 5/2008 | Shpunt et al. |
| 2008/0111710 A1 | 5/2008 | Boillot |
| 2008/0141181 A1 | 6/2008 | Ishigaki et al. |
| 2008/0273764 A1 | 11/2008 | Scholl |
| 2008/0278589 A1 | 11/2008 | Thorn |
| 2008/0304740 A1 | 12/2008 | Sun et al. |
| 2008/0319356 A1 | 12/2008 | Cain et al. |
| 2009/0102840 A1 | 4/2009 | Li |
| 2009/0103780 A1 | 4/2009 | Nishihara et al. |
| 2009/0122146 A1 | 5/2009 | Zalewski et al. |
| 2009/0203993 A1 | 8/2009 | Mangat et al. |
| 2009/0203994 A1 | 8/2009 | Mangat et al. |
| 2009/0217211 A1 | 8/2009 | Hildreth et al. |
| 2009/0257623 A1 | 10/2009 | Tang et al. |
| 2009/0274339 A9 | 11/2009 | Cohen et al. |

(56) References Cited

U.S. PATENT DOCUMENTS

| | | |
|---|---|---|
| 2009/0309710 A1 | 12/2009 | Kakinami |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0058252 A1 | 3/2010 | Ko |
| 2010/0095206 A1 | 4/2010 | Kim |
| 2010/0118123 A1 | 5/2010 | Freedman et al. |
| 2010/0125815 A1 | 5/2010 | Wang et al. |
| 2010/0156676 A1 | 6/2010 | Mooring et al. |
| 2010/0158372 A1 | 6/2010 | Kim et al. |
| 2010/0177049 A1 | 7/2010 | Levy et al. |
| 2010/0177929 A1 | 7/2010 | Kurtz et al. |
| 2010/0199221 A1 | 8/2010 | Yeung et al. |
| 2010/0201880 A1 | 8/2010 | Iwamura |
| 2010/0219934 A1 | 9/2010 | Matsumoto |
| 2010/0222102 A1 | 9/2010 | Rodriguez |
| 2010/0277411 A1 | 11/2010 | Yee et al. |
| 2010/0278393 A1 | 11/2010 | Snook et al. |
| 2010/0296698 A1 | 11/2010 | Lien et al. |
| 2010/0302357 A1 | 12/2010 | Hsu et al. |
| 2010/0306712 A1 | 12/2010 | Snook et al. |
| 2010/0306713 A1 | 12/2010 | Geisner et al. |
| 2010/0309097 A1 | 12/2010 | Raviv et al. |
| 2011/0007072 A1 | 1/2011 | Khan et al. |
| 2011/0026765 A1 | 2/2011 | Ivanich et al. |
| 2011/0043806 A1 | 2/2011 | Guetta et al. |
| 2011/0057875 A1 | 3/2011 | Shigeta et al. |
| 2011/0066984 A1 | 3/2011 | Li |
| 2011/0080470 A1 | 4/2011 | Kuno et al. |
| 2011/0093820 A1 | 4/2011 | Zhang et al. |
| 2011/0107216 A1 | 5/2011 | Bi |
| 2011/0115486 A1 | 5/2011 | Frohlich et al. |
| 2011/0119640 A1 | 5/2011 | Berkes et al. |
| 2011/0134112 A1 | 6/2011 | Koh et al. |
| 2011/0148875 A1 | 6/2011 | Kim et al. |
| 2011/0169726 A1 | 7/2011 | Holmdahl et al. |
| 2011/0173204 A1 | 7/2011 | Murillo et al. |
| 2011/0173235 A1* | 7/2011 | Aman ............... A63B 24/0021 707/792 |
| 2011/0173574 A1 | 7/2011 | Clavin et al. |
| 2011/0181509 A1 | 7/2011 | Rautiainen et al. |
| 2011/0193939 A1 | 8/2011 | Vassigh et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0251896 A1 | 10/2011 | Impollonia et al. |
| 2011/0267259 A1 | 11/2011 | Tidemand et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2011/0314427 A1 | 12/2011 | Sundararajan |
| 2012/0038637 A1 | 2/2012 | Marks |
| 2012/0050157 A1 | 3/2012 | Latta et al. |
| 2012/0062489 A1 | 3/2012 | Andersson et al. |
| 2012/0062558 A1 | 3/2012 | Lee et al. |
| 2012/0065499 A1 | 3/2012 | Chono |
| 2012/0068914 A1 | 3/2012 | Jacobsen et al. |
| 2012/0079421 A1 | 3/2012 | Arriola |
| 2012/0105613 A1 | 5/2012 | Weng et al. |
| 2012/0150650 A1 | 6/2012 | Zahand |
| 2012/0151421 A1 | 6/2012 | Clarkson |
| 2012/0157203 A1 | 6/2012 | Latta et al. |
| 2012/0167134 A1 | 6/2012 | Hendricks et al. |
| 2012/0204133 A1 | 8/2012 | Guendelman et al. |
| 2012/0223959 A1 | 9/2012 | Lengeling |
| 2012/0250936 A1 | 10/2012 | Holmgren |
| 2012/0268410 A1 | 10/2012 | King et al. |
| 2012/0320080 A1 | 12/2012 | Giese et al. |
| 2013/0019204 A1 | 1/2013 | Kotler et al. |
| 2013/0167092 A1 | 6/2013 | Yu et al. |
| 2013/0191911 A1 | 7/2013 | Dellinger et al. |
| 2013/0222233 A1 | 8/2013 | Park et al. |
| 2013/0222640 A1 | 8/2013 | Baek et al. |
| 2013/0239059 A1 | 9/2013 | Chen et al. |
| 2013/0257736 A1 | 10/2013 | Hou et al. |
| 2013/0307935 A1 | 11/2013 | Rappel et al. |
| 2013/0321265 A1 | 12/2013 | Bychkov et al. |
| 2014/0055385 A1 | 2/2014 | Duheille |
| 2014/0063060 A1 | 3/2014 | Maciocci et al. |
| 2014/0113507 A1 | 4/2014 | Vanzetto |
| 2014/0118255 A1 | 5/2014 | Billerbeck |
| 2014/0125813 A1 | 5/2014 | Holz |
| 2014/0134733 A1 | 5/2014 | Wu et al. |
| 2014/0139641 A1 | 5/2014 | Holz |
| 2014/0157135 A1 | 6/2014 | Lee et al. |
| 2014/0157209 A1 | 6/2014 | Dalal et al. |
| 2014/0177913 A1 | 6/2014 | Holz |
| 2014/0201674 A1 | 7/2014 | Holz |
| 2014/0201683 A1 | 7/2014 | Holz |
| 2014/0201684 A1 | 7/2014 | Holz |
| 2014/0201690 A1 | 7/2014 | Holz |
| 2014/0222385 A1 | 8/2014 | Muenster et al. |
| 2014/0223385 A1 | 8/2014 | Ton et al. |
| 2014/0240215 A1 | 8/2014 | Tremblay et al. |
| 2014/0247695 A1* | 9/2014 | Vangeel ............... H04W 4/005 367/93 |
| 2014/0258880 A1 | 9/2014 | Holm et al. |
| 2014/0304665 A1 | 10/2014 | Holz |
| 2014/0306903 A1 | 10/2014 | Huang et al. |
| 2014/0307920 A1 | 10/2014 | Holz |
| 2014/0340311 A1 | 11/2014 | Holz |
| 2014/0344731 A1 | 11/2014 | Holz |
| 2014/0344762 A1 | 11/2014 | Grasset et al. |
| 2015/0003673 A1 | 1/2015 | Fletcher |
| 2015/0084864 A1 | 3/2015 | Geiss et al. |
| 2015/0116214 A1 | 4/2015 | Grunnet-Jepsen et al. |
| 2015/0153832 A1 | 6/2015 | Krepec |
| 2015/0220150 A1 | 8/2015 | Plagemann et al. |
| 2015/0220776 A1 | 8/2015 | Cronholm |
| 2015/0227795 A1 | 8/2015 | Starner et al. |
| 2015/0293597 A1 | 10/2015 | Mishra et al. |
| 2015/0363070 A1 | 12/2015 | Katz |
| 2016/0328022 A1 | 11/2016 | Holz |

FOREIGN PATENT DOCUMENTS

| | | |
|---|---|---|
| EP | 1477924 A2 | 11/2004 |
| EP | 2369443 A2 | 9/2011 |
| GB | 2419433 A | 4/2006 |
| JP | 2002512069 A | 4/2002 |
| KR | 20090006825 A | 1/2009 |
| WO | 2014113507 A1 | 7/2014 |

OTHER PUBLICATIONS

PCT/US2014/011737—International Preliminary Report on Patentability dated Jul. 21, 2016, 14 pages.

PCT/US2014/011737—International Search Report and Written Opinion dated May 30, 2014, 20 pages.

U.S. Appl. No. 14/156,418—Office Action dated Aug. 22, 2016, 11 pages.

U.S. Appl. No. 14/156,426—Office Action dated Sep. 19, 2016, 32 pages.

U.S. Appl. No. 14/156,420—Office Action dated Aug. 24, 2016, 8 pages.

U.S. Appl. No. 14/156,424—Office Action dated Sep. 20, 2016, 32 pages.

U.S. Appl. No. 14/156,429—Office Action dated Oct. 5, 2016, 45 pages.

U.S. Appl. No. 14/156,420—Response to Aug. 24 Office Action filed Sep. 7, 2016, 12 pages.

(56) References Cited

OTHER PUBLICATIONS

U.S. Appl. No. 14/156,418—Response to Aug. 22 Office Action filed Nov. 22, 2016, 7 pages.
U.S. Appl. No. 14/154,730—Office Action dated Nov. 6, 2015, 9 pages.
U.S. Appl. No. 14/262,691—Office Action dated Dec. 11, 2015, 31 pages.
U.S. Appl. No. 14/281,817—Notice of Allowance mailed Apr. 22, 2016, 9 pages.
U.S. Appl. No. 15/213,899—Notice of Allowance dated Sep. 14, 2016, 7 pages.
U.S. Appl. No. 14/281,817—Notice of Allowance mailed Aug. 2, 2016, 9 pages.
U.S. Appl. No. 14/281,817—Response to Sep. 28 Office Action filed Dec. 28, 2015, 3 pages.
U.S. Appl. No. 14/281,825—Office Action dated Feb. 11, 2016, 19 pages.
U.S. Appl. No. 14/155,722—Office Action dated Nov. 20, 2015, 14 pages.
U.S. Appl. No. 14/281,825—Office Action dated Aug. 25, 2016, 22 pages.
U.S. Appl. No. 14/281,825—Response to Feb. 11 Office Action filed May 11, 2016, 12 pages.
U.S. Appl. No. 14/281,825—Response to Aug. 25 Office Action filed Nov. 15, 2016, 12 pages.
U.S. Appl. No. 14/339,367—Office Action dated Dec. 3, 2015, 17 pages.
U.S. Appl. No. 14/339,367—Non-Final Office Action dated Sep. 8, 2016, 21 pages.
U.S. Appl. No. 14/476,694—Office Action dated Nov. 1, 2016, 28 pages.

* cited by examiner

SYSTEMS AND METHODS FOR PROVIDING NORMALIZED PARAMETERS OF MOTIONS OF OBJECTS IN THREE-DIMENSIONAL SPACE

PRIORITY AND RELATED STATEMENTS

This application claims the benefit of U.S. patent application No. 61/824,666, titled "SYSTEMS AND METHODS FOR PROVIDING NORMALIZED PARAMETERS OF MOTIONS OF OBJECTS IN THREE-DIMENSIONAL SPACE", filed 17 May 2013.

FIELD OF THE TECHNOLOGY DISCLOSED

The technology disclosed relates, in general, to image analysis, and in particular to implementations providing normalized parameters of motions of objects in three-dimensional (3D) space.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Users may interact with electronic devices, such as a computer or a television, or computing applications, such as computer games, multimedia applications, or office applications, via their gestures. Typically, the user's gestures may be detected using an optical imaging system, and characterized and interpreted by suitable computational resources. For example, a user near a TV may perform a sliding hand gesture, which is detected by the motion-capture system; in response to the detected gesture, the TV may activate and display a control panel on the screen, allowing the user to make selections thereon using subsequent gestures; for example, the user may move her hand in an "up" or "down" direction, which, again, is detected and interpreted to facilitate channel selection.

While utilization of user gestures to interact with electronic devices and/or computing applications has generated substantial consumer excitement and may ultimately supplant conventional control modalities that require physical contact between the user and a control element, many current motion-capture systems suffer from excessive processing time and/or low detection sensitivity. For example, a motion-capture system may detect a user's gestures regardless of the actual distance traversed by the user's movement. If the user's gestures in fact occupy a small fraction of the working volume in which a system can detect gestures, analyzing the entire working volume over a sequence of processed images wastes computational resources. In addition, because the spatial region within which a user's gestures take place can vary; some users may perform a gesture on a small scale, while other users may traverse a much larger spatial region in performing the same gesture. Accordingly, the user's gestural intent typically cannot be inferred merely from the detected distance traversed by, for example, the user's finger. Interpreting gestural intent without either wasting computational resources or ignoring relevant portions of a user's movement represents a substantial challenge.

Consequently, there is a need for a motion-capture system that detects gestures in a determined subset of the working volume whose size and location corresponds to the region where particular users perform gesture-related movements.

SUMMARY

Implementations of the technology disclosed relate to motion-capture systems that detect user gestures using detection zones to save computational time and cost and/or to provide normalized position-based parameters, such as position coordinates or movement vectors, to application developers, electronic devices, computing applications, or other persons, entities or systems, thereby reducing and/or simplifying the task of detecting the position of objects making gestures. As used herein, the term "object" broadly connotes a user's finger, hand or other body part, or an item held by the user's in performing a gesture, or in some cases, the user herself. The detection zones may be established explicitly by a user or a computer application, or may instead be determined from the user's pattern of gestural activity. The detection zones may have three-dimensional (3D) boundaries or may be two-dimensional (2D) frames. In one implementation, the detection zones are adapted to a user's habits when performing gestures and are scaled and located to follow the user's motions. The size and location of the detection zone may be adjusted based on the distance and direction between the user and the motion-capture system. In various embodiments, the detected parameters of each user's gestures are (re)scaled based on, for example, the dimensions of the detection zone associated with the user. For example, within the detection zone a parameter indicating the size of the trajectory corresponding to the gesture may vary from zero to one, or between zero and the maximum number of pixels in the detection images, or between any other values set by application designers, users or others. Accordingly, the rescaled parameters may indicate the user's intent of performing various degrees of movements as contrasted with a simple distance measure that may be completely uncorrelated with gestural intent. As a result, the rescaled normalized parameters of each user's movements can be directly output from the motion-capture system for further processing that enables convenient processing and interpretation of different users' interactions with electronic devices and/or computing applications running thereon.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. These and other advantages and features of the embodiments herein described, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
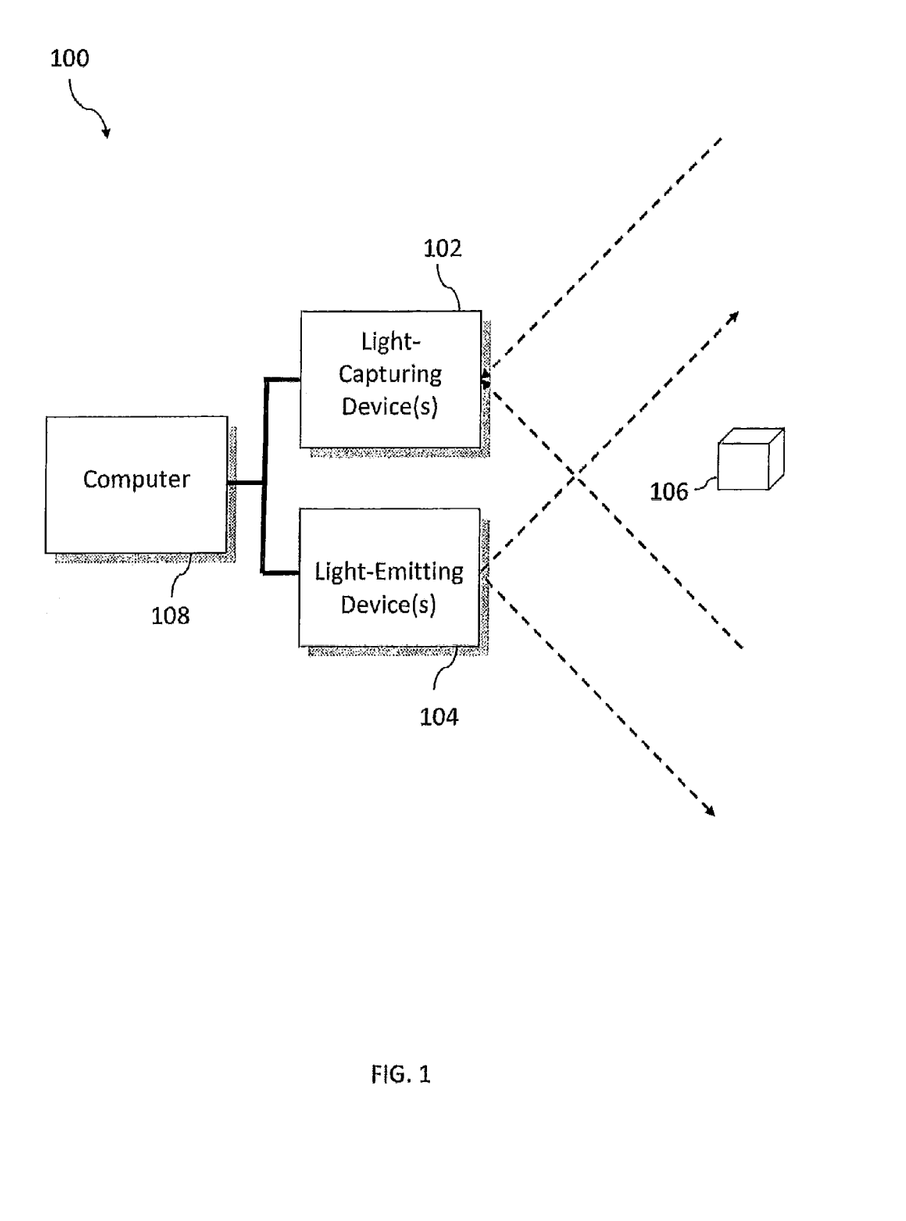
FIG. 1 is a simplified block diagram of an exemplary task environment to which implementations of the technology disclosed can be directed.

A motion-capture system suitable for implementing the technology disclosed can include a camera for acquiring images of an object; a computer for processing the images to identify and characterize the object; and a computer display for displaying information related to the identified/characterized object. A light source may also be included to illuminate the object. FIG. 1 illustrates a motion-capture system 100. The system 100 includes one or more light-capturing devices 102 (e.g., digital cameras or similar devices), each including an image sensor (e.g., a CCD or CMOS sensor), an associated imaging optic (e.g., a lens), and a window of transparent material protecting the lens from the environment. Two or more cameras 102 may be arranged such that their fields of view overlap in a viewed region. One or more light-emitting devices 104 may be used to illuminate an object 106 in the field of view. The cameras 102 provide digital image data to a computer 108, which analyzes the image data to determine the 3D position, orientation, and/or motion of the object 106 the field of view of the cameras 102.

The cameras 102 may be visible-light cameras, infrared (IR) cameras, ultraviolet cameras, or cameras operating in any other electromagnetic frequency regime. Preferably, the cameras 102 are capable of capturing video images. The particular capabilities of cameras 102 may vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be a cube of one meter in length. To capture motion of a running person, the volume of interest might have dimensions of tens of meters in order to observe several strides.

The cameras may be oriented in any convenient manner. In one embodiment, the optical axes of the cameras 102 are parallel, in other implementations the optical axes are not parallel. As described below, each camera 102 may be used to define a "vantage point" from which the object 106 is seen. If the location and view direction associated with each vantage point are known, the locus of points in space that project onto a particular position in the camera's image plane may be determined. In some embodiments, motion capture is reliable only for objects in an area where the fields of view of cameras 102 overlap; and cameras 102 may be arranged to provide overlapping fields of view throughout the area where motion of interest is expected to occur. In other embodiments, the system 100 may include one or more light sources 104, and the cameras 102 measure the reflection of the light emitted by the light sources on objects 106. The system may include, for example, two cameras 102 and one light source 104; one camera 102 and two light sources 104; or any other appropriate combination of light sources 104 and cameras 102.

Figure 2:
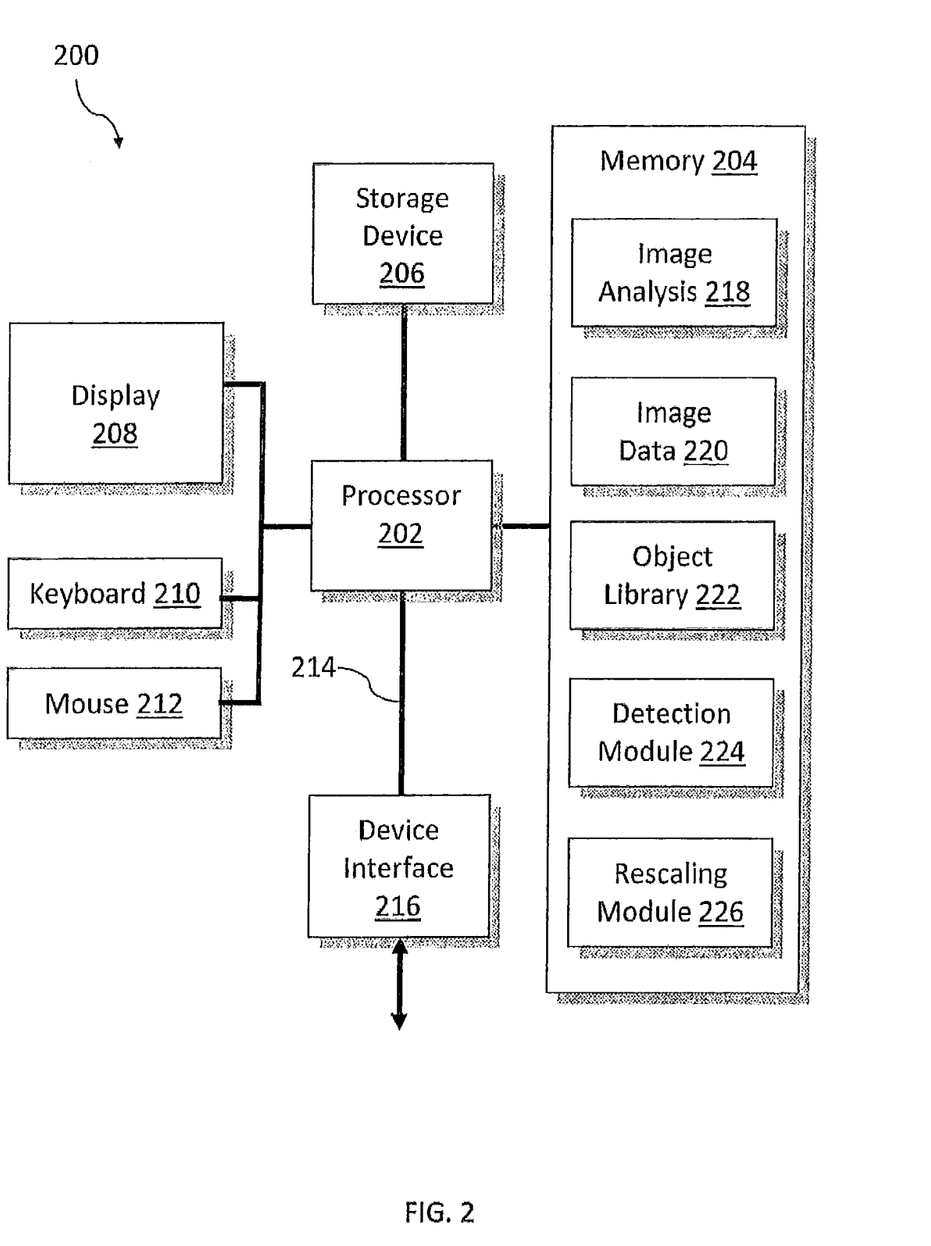
FIG. 2 is a simplified block diagram of a suitably programmed general-purpose computer implementing a motion-capture system according to an implementation of the technology disclosed.

Computer 108 may generally be any device or combination of devices capable of processing image data using techniques described herein. FIG. 2 is a simplified block diagram of a suitably programmed general-purpose computer 100 implementing the computer 108 according to an implementation of the technology disclosed. The computer 200 includes a processor 202 with one or more central processing units (CPUs), volatile and/or non-volatile main memory 204 (e.g., RAM, ROM, or flash memory), one or more mass storage devices 206 (e.g., hard disks, or removable media such as CDs, DVDs, USB flash drives, etc. and associated media drivers), a display device 208 (e.g., a liquid crystal display (LCD) monitor), user input devices such as keyboard 210 and mouse 212, and one or more buses 214 (e.g., a single system bus shared between all components, or separate memory and peripheral buses) that facilitate communication between these components.

The cameras 102 and/or light sources 104 may connect to the computer 200 via a universal serial bus (USB), FireWire, or other cable, or wirelessly via Bluetooth, Wi-Fi, etc. The computer 200 may include a camera interface 216, implemented in hardware (e.g., as part of a USB port) and/or software (e.g., executed by processor 202), that enables communication with the cameras 102 and/or light sources 104. The camera interface 216 may include one or more data ports and associated image buffers for receiving the image frames from the cameras 102; hardware and/or software signal processors to modify the image data (e.g., to reduce noise or reformat data) prior to providing it as input to a motion-capture or other image-processing program; and/or control signal ports for transmit signals to the cameras 102, e.g., to activate or deactivate the cameras, to control camera settings (frame rate, image quality, sensitivity, etc.), or the like.

The main memory 204 may be used to store instructions to be executed by the processor 202, conceptually illustrated as a group of modules. These modules generally include an operating system (e.g., a Microsoft WINDOWS, Linux, or APPLE OS X operating system) that directs the execution of low-level, basic system functions (such as memory allocation, file management, and the operation of mass storage devices), as well as higher-level software applications such as, e.g., a motion-capture (mocap) program 218 for analyzing the camera images to track the position of an object of interest and/or a motion-response program for computing a series of output images (or another kind of response) based on the tracked motion. Suitable algorithms for motion-capture program are described further below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules may be programmed in any suitable programming language, including, without limitation high-level languages such as C, C++, C#, OpenGL, Ada, Basic, Cobra, Fortran, Java, Lisp, Perl, Python, Ruby, or Object Pascal, or low-level assembly languages.

The memory 204 may further store input and/or output data associated with execution of the instructions (including, e.g., input and output image data 220) as well as additional information used by the various software applications; for example, in some embodiments, the memory 204 stores an object library 222 of canonical models of various objects of interest. As described below, an object detected in the camera images may be identified by matching its shape to a model in the object library 222, and the model may then inform further image analysis, motion prediction, etc. In addition, the memory 204 may include a detection module 224, which determines a detection zone in 3D space within which the object typically moves, and a (re)scaling module 226, which may rescale the coordinates of a detected object's movement based on, for example, the dimensions of the detection zone.

In various implementations, the motion captured in a series of camera images is used to compute a corresponding series of output images for display on the computer screen 208. For example, camera images of a moving hand may be translated into a wire-frame or other graphic depiction of the hand by the processor 202. Alternatively, hand gestures may be interpreted as input used to control a separate visual output; by way of illustration, a user may be able to use upward or downward swiping gestures to "scroll" a webpage or other document currently displayed, or open and close her hand to zoom in and out of the page. In any case, the output images are generally stored in the form of pixel data in a frame buffer, which may, but need not be, implemented in main memory 204. A video display controller reads out the frame buffer to generate a data stream and associated control signals to output the images to the display 208. The video display controller may be provided along with the processor 202 and memory 204 on-board the motherboard of the computer 200, and may be integrated with the processor 202 or implemented as a co-processor that manipulates a separate video memory. In some embodiments, the computer 200 is equipped with a separate graphics or video card that aids with generating the feed of output images for the display 208. The video card generally includes a graphical processing unit ("GPU") and video memory, and is useful, in particular, for complex and computationally expensive image processing and rendering. The graphics card may implement the frame buffer and the functionality of the video display controller (and the on-board video display controller may be disabled). In general, the image-processing and motion-capture functionality of the system may be distributed between the GPU and the main processor 202 in various conventional ways that are well characterized in the art.

The computer 200 is an illustrative example; variations and modifications are possible. Computers may be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some embodiments, one or more cameras may be built into the computer rather than being supplied as separate components. Further, the computer processor may be a general-purpose microprocessor, but depending on implementation can alternatively be, e.g., a microcontroller, peripheral integrated circuit element, a customer-specific integrated circuit ("CSIC"), an application-specific integrated circuit ("ASIC"), a logic circuit, a digital signal processor ("DSP"), a programmable logic device such as a field-programmable gate array ("FPGA"), a programmable logic device ("PLD"), a programmable logic array ("PLA"), smart chip, or other device or arrangement of devices.

Further, while computer 200 is described herein with reference to particular blocks, this is not intended to limit the technology disclosed to a particular physical arrangement of distinct component parts. For example, in some embodiments, the cameras 102 are connected to or integrated with a special-purpose processing unit that, in turn, communicates with a general-purpose computer, e.g., via direct memory access ("DMA"). The processing unit may include one or more image buffers for storing the image data read out from the camera sensors, a GPU or other processor and associated memory implementing at least part of the motion-capture algorithm, and a DMA controller. The processing unit may provide processed images or other data derived from the camera images to the computer for further processing. In some embodiments, the processing unit sends display control signals generated based on the captured motion (e.g., of a user's hand) to the computer, and the computer uses these control signals to adjust the on-screen display of documents and images that are otherwise unrelated to the camera images (e.g., text documents or maps) by, for example, shifting or rotating the images.

Figure 3A:
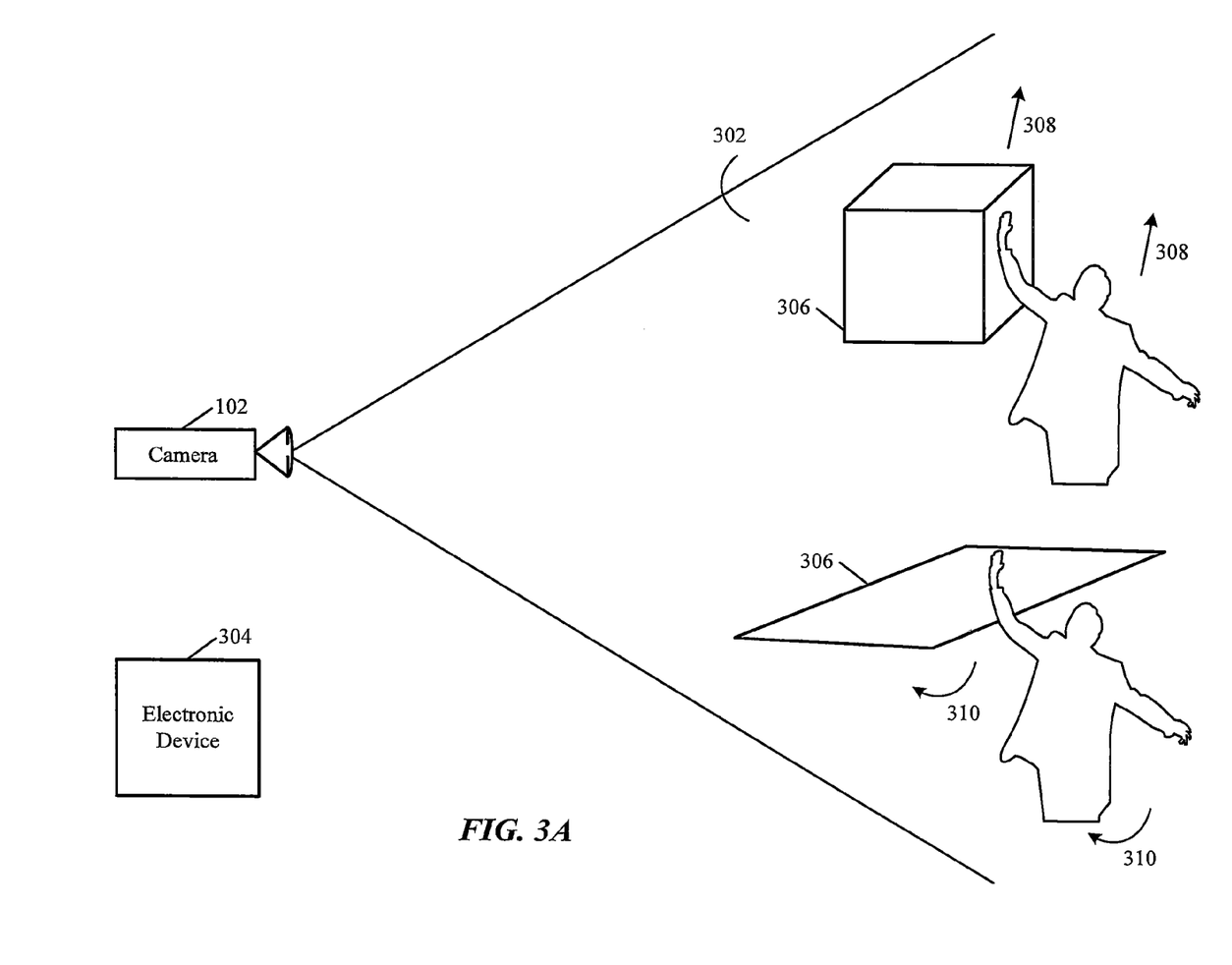
FIG. 3A depicts a detection zone associated with a user in accordance with an implementation of the technology disclosed.

Referring to FIG. 3A, the cameras 102 typically have a wide field of view and, as a result, a large spatial region 302 proximate to the user can be monitored. In particular, the cameras 102 can capture images containing any gestures performed by the user at any frame rate; these captured images are then analyzed to detect and identify gestures and, based thereon, to facilitate user interactions with, for example, an electronic device 304 and/or a computing application implemented therein. In some embodiments, the motion-capture system utilizes a detection module 224, which allows the user to specify, directly or indirectly, a portion of the spatial region 302 to be a detection zone 306 associated with the object performing the gestures. Actions within the detection zone 306 are analyzed for gestural content, whereas actions performed outside of the detection zone 306 are discarded or, in some embodiments, subjected to a coarser level of processing.

The user may define the detection zone 306 to be large enough to capture most or all gestures the user intends to perform. However, increasing the size of the detection zone 306 may increase the size of the captured images, i.e., the captured images will have more pixels. Increased captured image size may increase the image processing time and/or computational requirements for processing the gestures. Accordingly, the optimally sized detection zone 306 may be large enough to capture most gestures within a tolerance limit. In some embodiments, if the user's gesture extends beyond the detection zone 306, the motion-capture system alerts the users with a signal so that the user may confine further gestures to be within the detection zone or change the size of the detection zone 306. The detection zone 306 may comprise a 3D volume and have 3D boundaries or alternatively, may be a 2D area located in the spatial region 302 and oriented in any direction (e.g., horizontally, vertically, or anything in between). Additionally, the detection zone 306 may be displayed on any presentation device (e.g., display, projector, etc.) operable with the motion-capture system (e.g., for training purposes) or any surface or device that is associated with the motion-capture system.

In some implementations, the dimensions of the detection zone 306 are set manually by the user, e.g. in response to an on-screen prompt. For example, with reference to FIGS. 2 and 3A, the detection module 224 may generate a graphical box depiction on the display 208, which the user enlarges by, for example, pointing to a corner and dragging it. The detection module 224 recognizes the gesture as an intention to enlarge the box and causes this to occur on the display 208. A pointing gesture begun in the middle of the box may be interpreted as an intention to move the box, and once again, the detection module 224 causes this to occur on the display 208. Alternatively, the user can be prompted to define zone 306 with a sweep of the hand for example.

In other implementations, the size and location of the detection zone 306 are adapted to the users' behavior when performing gestures. For example, the user and/or detection module 224 may first define a detection zone having a size of 10 cm×10 cm×10 cm. These dimensions, however, may not be large enough and gestures performed by the user may lie outside of or extend beyond the detection zone 306 and therefore be discarded. In one implementation, the detection module 224 dynamically adjusts the size of the detection zone 306 based on, for example, a gesture discard rate. If the discard rate is above a predetermined maximum threshold, the detection module 224 increases the size of the detection zone 306 automatically or upon receiving a confirmation from the user. In some embodiments, the motion-capture system reduces the size of the detection zone 306 when, for example, the gesture discard rate is below a minimum threshold value (e.g., 5%). The detection module 224 may be implemented as a stand-alone module, as part of a motion capture system, or as part of a specific application (such as a game or controller logic for a television) or in specific hardware; for example, the motion capture system may allow designers of the application/hardware to modify or establish a default size of the detection zone 306 based on suitability for the application/hardware. In addition, the detection zone 306 may change position based on motions of the user. For example, when the user moves her position by 50 cm in a direction 308 wholly or partially perpendicular to the optical axes of the cameras 102, 104 or rotates her arm, hand, or body by an angle 310 relative to the cameras 102, 104, the detection zone may similarly move its position 50 cm in the direction 308 or rotate by an angle 310, respectively, to adequately capture the user's gestures. Further, the size of the detection zone 306 may be adjusted based on the distance between the user and the cameras. For example, when the user moves close to the cameras, the size of the detection zone 306 may be automatically adjusted to compensate for gestures being performed closer to the cameras.

Figure 3B:
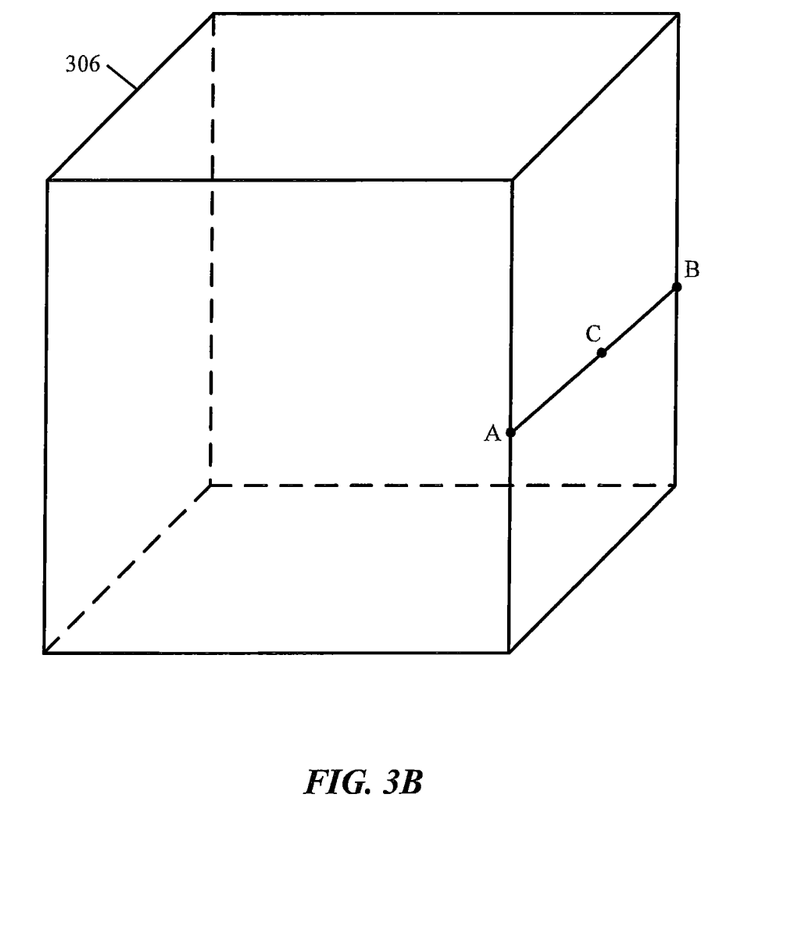
FIG. 3B depicts an approach for (re)scaling coordinates of user's motions in accordance with an implementation of the technology disclosed.

The motion-capture system may then process the images captured within the detection zone 306 to determine parameters, which may include position coordinates or movement vectors, associated with the gestures. In implementations, the motion-capture system 200 includes a (re)scaling module 226 that rescales the determined parameters based on, for example, the dimensions of the detection zone 306. Referring to FIG. 3B, the boundaries of the detection zone 306 define the maximum movement that can be fully detected in 3D space and processed by the motion-capture system 200. Movement outside the detection zone 306 may or may not be processed by other functional modules of the motion-capture system 200. Accordingly, when the user performs a movement from one boundary to the opposing boundary, for example from point A to point B as illustrated in FIG. 3B, the (re)scaling module 226 recognizes that movement as a 100% movement because the movement is a complete traversal of the gesture space. If the user performs another movement from point A to point C, for example, the (re) scaling module 226 recognizes the movement a 60% movement because point C is located 60% of the way from point A to point B. Because each user may have a differently sized detection zone 306, (re)scaling each user's movements based on her own detection zone creates normalized parameters reflecting the dimensions of that user's detection zone; ideally, because the dimensions of the detection zone 306 are scaled for different users, similar normalized parameters will reflect similar gestural intents across users. This approach thus provides a simple and consistent interface between the motion-capture system and other electronic devices and/or computational applications for various users.

The above example describes, for illustrative purposes, generating a normalized parameter for movement in one direction. Implementations of the technology disclosed include providing normalized parameters in two or three dimensions of movement. For example, the (re)scaling module 226 may locate an object within the detection zone 306 and normalize its trajectory through the zone, e.g., that the object has passed through 50% of the zone along the x-dimension, 40% along the y-dimension, and 70% of the z-dimension. The normalized parameters may be given in accordance with any scale or numbering system; for example, they may be given as decimals between 0.0 and 1.0 or between 0 and 100, or in terms of the number of pixels traversed with the motion projected onto a plane. The technology disclosed is not limited to any particular number format.

In some embodiments, the dimensions of the detection zone 306 are associated with the maximum number of pixels of the captured images or other values set by the users and/or other people (such as the designers of the computing applications). In addition, for illustration purposes, the (re)scaling approach of the detected parameters described herein is based on the dimensions of the detection zone. The (re) scaling module 226, however, may rescale the determined motion parameters based on any other parameters that are suitable for generating normalized coordinates for the detected movements of the users or any other objects, thereby enabling various users' interactions with the electronic devices and/or computing applications.

Embodiments may be employed in a variety of application areas, such as for example and without limitation consumer applications including interfaces for computer systems, laptops, tablets, television, game consoles, set top boxes, telephone devices and/or interfaces to other devices; medical applications including controlling devices for performing robotic surgery, medical imaging systems and applications such as CT, ultrasound, x-ray, MRI or the like, laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigations systems control, on-board entertainment systems control and/or environmental systems control; automotive applications including interfaces to automobile operational systems control, navigation systems control, on-board entertainment systems control and/or environmental systems control; security applications including, monitoring secure areas for suspicious activity or unauthorized personnel; manufacturing and/or process applications including interfaces to assembly robots, automated test apparatus, work conveyance devices such as conveyors, and/or other factory floor systems and devices, genetic sequencing machines, semiconductor fabrication related machinery, chemical process machinery and/or the like; and/or combinations thereof.

Implementations of the technology disclosed may further be mounted on automobiles or other mobile platforms to provide information to systems therein as to the outside environment (e.g., the positions of other automobiles). Further implementations of the technology disclosed may be used to track the motion of objects in a field of view or used in conjunction with other mobile-tracking systems. Object tracking may be employed, for example, to recognize gestures or to allow the user to interact with a computationally rendered environment; see, e.g., U.S. Patent Application Ser. Nos. 61/752,725 (filed on Jan. 15, 2013) and Ser. No. 13/742,953 (filed on Jan. 16, 2013), the entire disclosures of which are hereby incorporated by reference.

It should also be noted that implementations of the technology disclosed may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain implementations of the technology disclosed were described above. It is, however, expressly noted that the technology disclosed is not limited to those implementations, but rather the intention is that additions and modifications to what was expressly described herein are also included within the scope of the technology disclosed. For example, while the technology has been discussed with reference to examples in which the detection zones generally take the form of parallelepipeds, there is no requirement that the detection zone have any particular shape, nor even be composed of flat sides nor orthogonal boundaries. Further, it may be appreciated that the techniques, devices and systems described herein with reference to examples employing light waves are equally applicable to methods and systems employing other types of radiant energy waves, such as acoustical energy or the like. Moreover, it is to be understood that the features of the various embodiments described herein were not mutually exclusive and can exist in various combinations and permutations, even if such combinations or permutations were not made express herein, without departing from the spirit and scope of the technology disclosed. In fact, variations, modifications, and other implementations of what was described herein will occur to those of ordinary skill in the art without departing from the spirit and the scope of the technology disclosed.

What is claimed is:

1. A method of tracking a movement of an object in 3D space, the method comprising:
    capturing a plurality of temporally sequential images of the object within the 3D space;
    automatically defining a detection zone in the 3D space, the detection zone including at least a portion of the object;
    computationally analyzing the images to determine movement parameters associated with, and describing movement of, the object portion as the object portion moves in at least three dimensions, including a first dimension, a second dimension and a third dimension freely through the 3D space at least partially within the detection zone;
    computationally scaling the movement parameters to generate normalized parameters normalized in the at least three dimensions relative to the detection zone;
    tracking occurrences of motions of the object falling outside of the detection zone and for occurrences of motions of the object falling outside of the detection zone, adjusting a value of a discard parameter to reflect the occurrence; and
    comparing the discard parameter to a threshold and based upon a result of the comparing, altering the detection zone.

2. The method of claim 1, wherein the detection zone has three-dimensional boundaries.

3. The method of claim 1, wherein the detection zone has two-dimensional boundaries.

4. The method of claim 1, further comprising altering a size of the detection zone to conform to movement of the object.

5. The method of claim 1, further comprising computationally determining a discard parameter value, wherein the discard parameter value relates to a quantity of instances of the object being detected within the 3D space and outside of the detection zone.

6. The method of claim 1, wherein the threshold is a predetermined threshold, the method further comprising enlarging the detection zone when the discard parameter is above the predetermined threshold value.

7. The method of claim 1, wherein the threshold is a predetermined threshold, the method further comprising shrinking the detection zone when the discard parameter is below the predetermined threshold value.

8. The method of claim 1, further comprising altering a position of the detection zone based on a detected position of the object.

9. The method of claim 1, wherein a size of the detection zone is initially determined based on a distance between the object and a motion-capture system.

10. The method of claim 1, wherein the movement parameters are rescaled based on dimensions of the detection zone.

11. The method of claim 1, wherein the movement parameters are rescaled based on a maximum number of pixels in the captured images.

12. The method of claim 1, further comprising computationally analyzing the images to determine movement parameters associated with the object's movement outside the detection zone;
    wherein the computational analysis of the object outside the detection zone is coarser that the computational analysis of the object within the detection zone.

13. A system for tracking movement of an object in 3D space, the system comprising:
    at least one camera oriented toward a field of view;
    at least one light source for directing illumination into the field of view, the camera cooperating with the at least one light source to capture a plurality of temporally sequential images of the field of view when illuminated by the at least one light source; and
    an image analyzer configured to:
        automatically define a detection zone in 3D space, the detection zone including at least a portion of the object;
        computationally analyze the images to determine movement parameters associated with, and describing movement of, the object portion as the object portion moves in at least three dimensions, including a first dimension, a second dimension and a third dimension freely through the 3D space at least partially within the detection zone; and computationally rescale the movement parameters to generate normalized parameters normalized in the at least three dimensions relative to the detection zone;

tracking occurrences of motions of the object falling outside of the detection zone and for occurrences of motions of the object falling outside of the detection zone, adjust a value of a discard parameter to reflect the occurrence; and compare the discard parameter to a threshold and based upon a result of the comparing, alter the detection zone.

14. The system of claim 13, wherein the image analyzer is further configured to dynamically adjust a size of the detection zone based on the object's movements.

15. The system of claim 13, wherein the image analyzer is further configured to computationally determine a discard parameter value, wherein the discard parameter value relates to a quantity of instances of the object being detected within the 3D space and outside of the detection zone.

16. The system of claim 13, wherein the threshold is a predetermined threshold and wherein the image analyzer is further configured to enlarge the detection zone when the discard parameter is above the predetermined threshold value.

17. The system of claim 13, wherein the threshold is a predetermined threshold and wherein the image analyzer is further configured to shrink the detection zone when the discard parameter is below the predetermined threshold value.

18. The system of claim 13, wherein the image analyzer is further configured to adjust a position of the detection zone based on a position of the object.

19. The system of claim 13, wherein the image analyzer is further configured to determine a size of the detection zone based on a distance between the object and the at least one camera.

20. The system of claim 13, wherein the image analyzer is further configured to rescale the movement parameters based on dimensions of the detection zone.

21. The system of claim 13, wherein the image analyzer is further configured to rescale the movement parameters based on a maximum number of pixels in the captured images.

22. The system of claim 13, wherein the image analyzer is further configured computationally analyze the images to determine movement parameters associated with the object's movement outside the detection zone;

wherein the computational analysis of the object outside the detection zone is coarser that the computational analysis of the object within the detection zone.

* * * * *